United States Patent Office 3,439,356
Patented Apr. 15, 1969

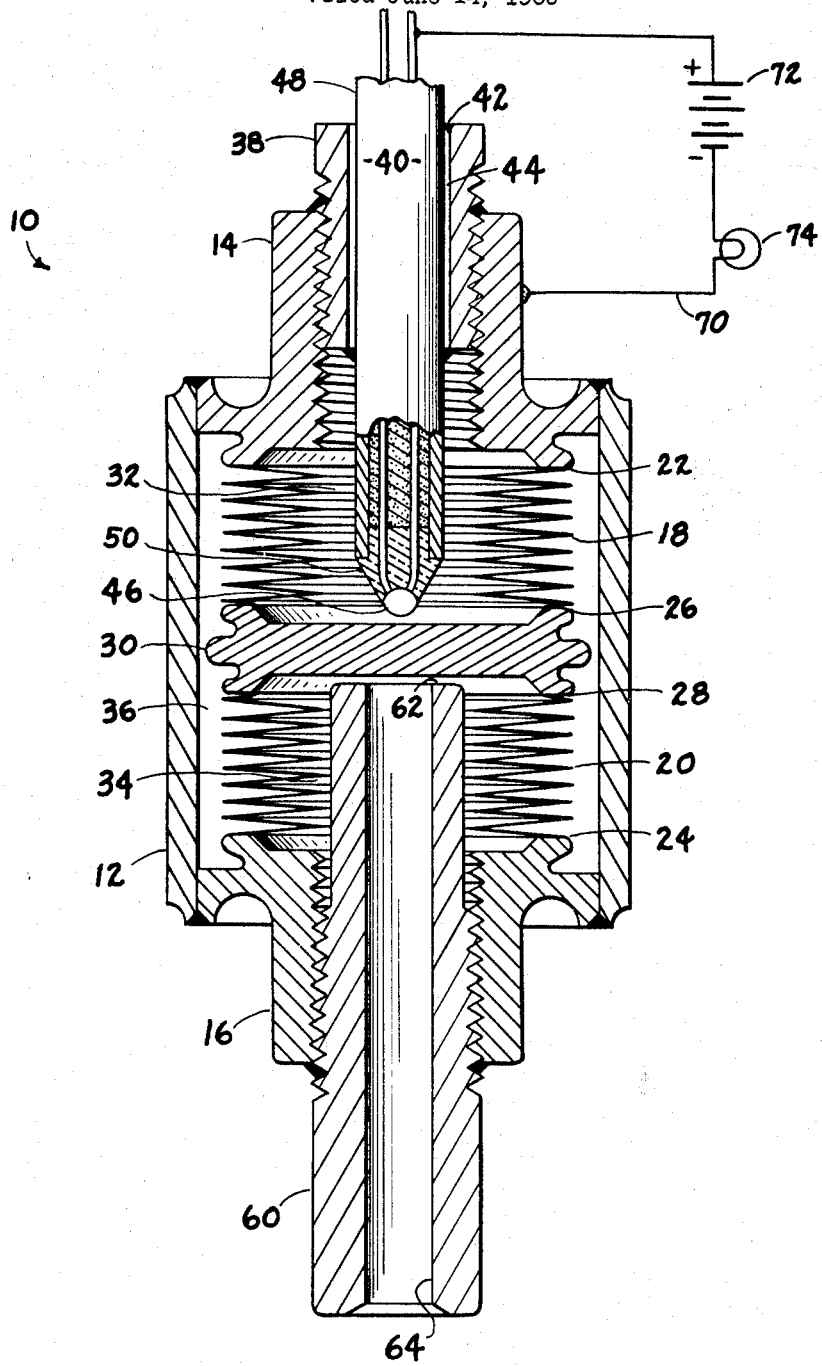

3,439,356
PRESSURE-TEMPERATURE SENSOR
Jackson E. Kinzer, Woodland Hills, Calif., assignor to North American Rockwell Corporation, a corporation of Delaware
Filed June 14, 1965, Ser. No. 463,772
Int. Cl. G08b 21/00; G01k 5/42; G01p 5/46
U.S. Cl. 340—236                                4 Claims

ABSTRACT OF THE DISCLOSURE

A pressure-temperature sensor having opposed bellows chambers coupled by a moveable electrical switch contact that is displaced between a fixed electrical switch contact-thermocouple junction and a cooperating physical stop spaced from the fixed switch contact.

BACKGROUND OF THE INVENTION

The accurate monitoring of pressure and temperature in an operating system is a continuing problem to engineers particularly when the operating system is in a hostile environment, and/or subject to high pressures and high temperatures, or the like. Such systems normally require monitoring from a remote location; however, adequate monitoring devices have not been available in the prior art which yield accurate data in these environments so that the operating system can be used with a high degree of safety and reliability.

OBJECTS OF THE INVENTION

Accordingly, it is an object of the invention to provide a new and improved pressure-temperature sensor.

Another object of the invention is to provide a pressure-temperature sensor particularly adapted for accurate and reliable operation in a hostile environment.

A further object of the invention is to provide a pressure-temperature sensor that can be used in close proximity to high pressure and high temperature sources.

It is also an object of the invention to provide a pressure-temperature sensor that has a high degree of sensitivity.

Likewise an object of the invention is to provide a pressure-temperature sensor that adds negligible volume to an operating system.

An additional object of the invention is to provide a pressure-temperature sensor that provides double containment.

SUMMARY OF THE INVENTION

Briefly, in accordance with a preferred embodiment of my invention, a new and improved pressure-temperature sensor is provided having casing means containing and supporting a pair of opposed bellows that have mutually adjacent inner ends connected to a coupling means so that the bellows define first and second bellows chambers within the casing means. A temperature sensor means is positioned in the first bellows chamber into which a balancing or reference pressure is introduced. A fluid having an unknown pressure is introduced into the second bellows chamber so that the coupling means is displaced from a free or neutral position when the unknown pressure in the second bellows chamber is greater than or less than the pressure in the first bellows chamber. The displaced coupling means physically contacts the temperature sensor means when the pressure in the second bellows chamber is greater than the pressure in the first bellows chamber and completes an electrical circuit that has a suitable indicator means so that adjustment of the balancing pressure in the first bellows chamber returns the coupling means to the neutral position. As the coupling means moves away from the temperature sensor means, the switch contact is opened. Opening of the switch indicates that the balance pressure in the first bellows chamber then equals the unknown pressure in the second pressure chamber. The temperature sensor means also senses environment temperature of the pressure-temperature sensor.

BRIEF DESCRIPTION OF THE DRAWING

Further objects, features, and the attending advantages of the invention will become apparent when the following description is read in view of the accompanying drawing in which the sole figure is a sectional view of a preferred embodiment of the pressure-temperature sensor.

DESCRIPTION OF THE INVENTION

Referring to the drawing, a preferred embodiment of the pressure-temperature sensor 10 of the invention has a casing or containment means formed by an electrically conductive cylinder 12 that is connected to opposed end plates or terminals 14 and 16 by welding or the like. The welded joints between the cylinder 12 and the end plates 14 and 16 provide a fluid tight casing means.

Opposed bellows means such as expandable, electrically conductive bellows 18 and 20 have respective outer ends 22 and 24 connected to the associated adjacent end plates 14 and 16. The bellows 18 and 20 have mutually adjacent inner ends 26 and 28 respectively connected to and spaced apart by a coupling means such as electrically conductive disc 30 to develop bellows chambers 32 and 34. It is preferred that the connections between the respective outer and inner ends of each of the bellows and the associated end plates and the coupling disc be fluid tight joints. It is contemplated that the volume 36 defined by cylinder 12 and end plates 14 and 16 about the opposed bellows means can be filled with a fluid at atmospheric pressure or at some other desired pressure.

A tube 38 is positioned through and supported by end plate 14. Tube 38 retains a thermocouple 40 in a spaced-apart relationship with the inner wall 42 of tube 38 by tack welding or the like so that an annular flow passage 44 is developed therebetween. Annular flow passage 44 is in fluid communication with bellows chamber 32.

Thermocouple 40 has a conventional junction 46 electrically insulated from the electrically conductive thermocouple sheath 48 by an insulator plug 50 formed from a suitable insulating material such as glass or the like. The thermocouple junction 46 is inserted into the bellows chamber 32 and adjusted to a desired spaced-apart relationship from the adjacent surface of coupling disc 30 in its free or neutral position. The thermocouple junction 46 when properly positioned within bellows chamber 32 provides a stop means that limits movement of coupling disc 30 away from its neutral position as shown. The thermocouple junction 46 further acts as a switch contact for an electrical switch as described hereinafter. Tube 40 is then connected to end plate 14 by a fluid tight joint such as is formed by welding or the like.

A tube 60 is positioned through and supported by end plate 16. In a manner similar to that previously described for tube 38, an inner end 62 of tube 60 is adjusted within bellows chamber 34 to a desired spaced-apart relationship with the adjacent surface of coupling disc 30. The inner end 62 forms a stop means that limits movement of the coupling disc 30 away from its neutral position as shown. Tube 60, after this adjustment, is connected to end plate 16 by a fluid tight joint such as that formed by welding or the like. An inner channel 64 of tube 60 is in fluid communication with the bellows chamber 34.

In certain operating environments, it is desirable to provide a double containment to minimize the probability of contamination of the balancing or reference fluid introduced into bellows chamber 32 by the fluid introduced into bellows chamber 34. Bellows 20 with fluid tight joints at the outer and inner ends 24 and 28, respectively, provides a first containment of the fluid introduced into bellows chamber 34. Bellows 18 which is similar to bellows 20 provides a second containment. If bellows 20 ruptures, bellows 18 will prevent fluid in bellows chamber 34 from contaminating the balancing fluid in bellows chamber 32. The casing means formed by cylinder 12 and end plates 14 and 16 provides additional containment.

Operatively, a fluid having an unknown pressure is introduced into bellows chamber 34 through tube 60. The introduction of fluid into bellows chamber 34 causes bellows 20 to expand and bellows 18 to contract when the fluid introduced into chamber 34 is at a pressure greater than that in bellows chamber 32. The expansion of bellows 20 displaces coupling disc 30 from the neutral position as shown towards the thermocouple junction 46. When the coupling disc 30 impinges upon thermocouple junction 46, an indicator means such as external indicator circuit 70 is closed. The external indicator circuit 70 has a source of electrical energy such as battery 72 and an indicator such as lamp 74. The use of other indicator means which are well-known to those skilled in the art is contemplated. Therefore, the indicator means as shown is not critical to the operation of my present invention. The indicator means signals when the coupling disc 30 is in physical contact with the thermocouple junction 46.

A balancing fluid at a known and adjustable pressure is introduced from an external source (not shown) through annular flow passage 44 into bellows chamber 32 and adjusted to expand the previously contracted bellows 18 and move coupling disc 30 to the original neutral position. As the coupling disc 30 is forced away from the thermocouple junction 46 toward the neutral position, the previously established physical and electrical contact between the thermocouple junction and the coupling disc is opened. The opening of the indicator circuit 70 signals that a balancing or reference pressure is present in bellows chamber 32 that is equal to or approximately equal to the unknown pressure of the fluid that was introduced into bellows chamber 34.

The thermocouple 40 can be used in a conventional manner to sense the temperature of the environment of the pressure-temperature sensor 10, as is well-known to those skilled in the art.

The following example is given as an indication of one pressure-temperature sensor similar to the embodiment illustrated and is offered to assure a working understanding of the present invention. This example is not to be interpreted as limiting the scope of my invention.

One pressure-temperature sensor, for example, has physical dimensions of a 0.35-inch diameter, 0.4-inch long cylinder. The overall length of the sensor is 0.65 inch and includes provision for balancing and unknown pressure connections. The bellows are 0.25 inch in diameter and formed from welded discs of 0.005-inch 347 stainless steel. The effective area of each bellows is approximately 0.01 inch$^2$ and an internal pressure of approximately 10 to 20 pounds per inch$^2$ is required to displace the coupling disc 0.001 inch from the free or neutral position. The switching action of the sensor permits control of a balancing pressure to within ±0.25 lb. per inch$^2$ of the unknown fluid pressure.

The pressure-temperature sensor has been subjected to differential pressures in excess of 1,000 lb. per inch$^2$ without bellows deformation. The stroke of the coupling disc has been limited to 0.005 inch to minimize bellows fatigue and therefore achieve an increased life expectancy. Pressures are possible to at least 2,000 p.s.i. at temperature ranges in excess of 1,300° F. Sample combined working ranges which are not necessarily limits are as follows:

1,300° F. at 60 p.s.i.
700° F. at 300 p.s.i.
70° F. at 2,000 p.s.i.

It is contemplated that the pressure-temperature sensor of my invention as shown and described can have several modifications. For example, it is contemplated that the introduction of the balancing or reference pressure to bellows chamber 32 can be through one or more inputs in the casing means rather than through the annular flow passage 44 as shown. Similarly, the introduction of the fluid at an unknown pressure into bellows chamber 34 can be through one or more inlets in the casing means rather than through tube 60.

While it is contemplated that the invention will sense both pressure and temperature, the thermocouple can be omitted and a suitable electrical switch contact positioned in the sensor to cooperate with the coupling disc. It is further contemplated that a separate electrical switch contact could be used in addition to the thermocouple as shown so that the thermocouple then would operate as a temperature sensor and not as both a temperature sensor and an electrical switch contact.

As will be evidenced from the foregoing description, certain aspects of the invention are not limited to the particular details of construction as illustrated and it is contemplated that other modifications, applications, and equivalent parts will occur to those skilled in the art.

Having described my invention, what is claimed is:

1. An improved pressure-temperature sensor comprising:
   (a) casing means having generally opposed and spaced-apart first and second end plates,
   (b) at least first and second opposed bellows means positioned within said casing means and having respective first and second outer ends connected by fluid tight joints to said first and second end plates and further having mutually adjacent respective first and second inner ends,
   (c) moveable electrical switch contact means positioned within said casing means and sealing said first and second inner ends,
   (d) first and second bellows chambers generally defined by said respective first and second bellows means connected to said first and second end plates and to said moveable switch contact means,
   (e) fixed electrical switch contact means positioned within said casing means and spaced from said first bellows means,
   (f) first stop means positioned within said casing means and spaced from said second bellows means,
   (g) said fiixed switch contact means and said first stop means positioned in a predetermined spaced-apart relationship with said moveable switch contact means displaced by said first and second bellows means between said fixed switch contact means and said first stop means into a first closed electrical contact position with said fixed switch contact means and into a second open eletcrical contact position limited by said first stop means.
   (h) indicator means electrically connected to said fixed switch contact means and said moveable switch contact means so that the first closed contact position and the second open contact position of said fixed and moveable switch contact means are suitably indicated, (i) first fluid inlet means in fluid communication with said first bellows chamber, and (j) second fluid inlet means in fluid communication with said second bellows chamber so that a fluid having an unknown pressure introduced into said second bellows chamber moves said moveable switch contact means into the first closed contact position and a fluid having an adjustable reference pressure introduced into said first bellows chamber substantially balances the unknown pressure so that said moveable switch contact means moves into the second open contact position.

2. The improved pressure-temperature sensor of claim 1 in which said fixed electrical switch contact means is a thermocouple junction for sensing at least the temperature of said fluid having an unknown pressure.

3. The improved pressure-temperature sensor of claim 1 in which said fixed electrical switch contact means includes a temperature sensing means.

4. The improved pressure-temperature sensor of claim 1 in which said moveable electrical switch contact means is an electrically conductive coupling disc.

References Cited

UNITED STATES PATENTS

| | | | |
|---|---|---|---|
| 1,899,672 | 2/1933 | Clark | 73—407 XR |
| 1,987,200 | 1/1935 | Mabey. | |
| 2,373,041 | 4/1945 | Martindell. | |
| 2,463,427 | 3/1949 | Richards | 73—359 |
| 3,092,821 | 6/1963 | Muehlner | 73—407 XR |
| 3,239,827 | 3/1966 | Werner et al. | 340—236 |

JOHN W. CALDWELL, Primary Examiner.

DANIEL K. MYER, Assistant Examiner.

U.S. Cl. X.R.

73—359; 340—228